(12) United States Patent
Goran et al.

(10) Patent No.: US 9,003,290 B2
(45) Date of Patent: Apr. 7, 2015

(54) IMAGE-DERIVED USER INTERFACE ENHANCEMENTS

(75) Inventors: Charles Goran, Seattle, WA (US); Feridoon Malekzadeh, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 922 days.

(21) Appl. No.: 12/629,828

(22) Filed: Dec. 2, 2009

(65) Prior Publication Data

US 2011/0131497 A1 Jun. 2, 2011

(51) Int. Cl.
- *G06F 3/00* (2006.01)
- *G06F 3/0481* (2013.01)
- *H04M 1/2745* (2006.01)
- *H04M 1/725* (2006.01)

(52) U.S. Cl.
CPC .......... *G06F 3/0481* (2013.01); *G06F 3/04817* (2013.01); *H04M 1/27455* (2013.01); *H04M 1/72544* (2013.01)

(58) Field of Classification Search
CPC ..................... H04M 1/72522; H04M 1/27455; H04M 1/576; G06F 3/04883
USPC ........................................................ 715/723
See application file for complete search history.

(56) References Cited

U.S. PATENT DOCUMENTS

| | | | |
|---|---|---|---|
| 6,493,677 B1 * | 12/2002 | von Rosen et al. .......... 705/26.5 |
| 7,274,822 B2 * | 9/2007 | Zhang et al. .................. 382/224 |
| 8,498,451 B1 * | 7/2013 | Agopian et al. ............... 382/118 |
| 2002/0066101 A1 | 5/2002 | Gordon et al. |
| 2002/0158808 A1 | 10/2002 | Inoue |
| 2002/0196293 A1 | 12/2002 | Suppan et al. |
| 2003/0007014 A1 | 1/2003 | Suppan et al. |
| 2003/0215144 A1 * | 11/2003 | Kito et al. ...................... 382/190 |
| 2004/0174434 A1 * | 9/2004 | Walker et al. ............... 348/211.3 |
| 2004/0207657 A1 * | 10/2004 | Svendsen ...................... 345/738 |
| 2004/0207722 A1 * | 10/2004 | Koyama et al. ............. 348/14.02 |
| 2005/0143124 A1 * | 6/2005 | Kennedy et al. ............ 455/556.1 |
| 2007/0028178 A1 | 2/2007 | Gibson et al. |
| 2007/0257933 A1 | 11/2007 | Klassen et al. |
| 2008/0052945 A1 * | 3/2008 | Matas et al. ...................... 34/173 |
| 2008/0155422 A1 * | 6/2008 | Manico et al. ................. 715/731 |
| 2008/0220750 A1 * | 9/2008 | Steinberg et al. .......... 455/414.1 |
| 2008/0250066 A1 * | 10/2008 | Ekstrand et al. ........... 707/104.1 |
| 2008/0288879 A1 | 11/2008 | Tomita et al. |
| 2008/0295027 A1 | 11/2008 | Seo et al. |
| 2009/0003648 A1 | 1/2009 | Reed et al. |

(Continued)

FOREIGN PATENT DOCUMENTS

| | | |
|---|---|---|
| KR | 1020060011004 | 2/2006 |
| KR | 1020060037999 | 5/2006 |
| KR | 1020090060429 | 6/2009 |

OTHER PUBLICATIONS

Das et al.; Automatic Face-based Image Grouping for Albuming; © 2003; IEEE; 6 pages.*

(Continued)

*Primary Examiner* — Linh K Pham
(74) *Attorney, Agent, or Firm* — Lee & Hayes, PLLC (57) ABSTRACT

A device configured to select a portion of an image, the selecting being based at least on parameters associated with a user interface element of the device, is disclosed herein. The device is further configured to apply the selected portion of the image to the user interface element.

20 Claims, 8 Drawing Sheets

(56) References Cited

U.S. PATENT DOCUMENTS

| | | | |
|---|---|---|---|
| 2009/0031246 A1* | 1/2009 | Cowtan et al. | 715/786 |
| 2009/0115863 A1* | 5/2009 | Lee | 348/222.1 |
| 2009/0125799 A1 | 5/2009 | Kirby | |
| 2009/0150884 A1 | 6/2009 | Fukuda | |
| 2009/0228820 A1 | 9/2009 | Kim et al. | |
| 2010/0041442 A1* | 2/2010 | Hong | 455/566 |
| 2010/0053342 A1* | 3/2010 | Hwang et al. | 348/207.99 |
| 2010/0054600 A1* | 3/2010 | Anbalagan et al. | 382/180 |
| 2010/0172550 A1* | 7/2010 | Gilley et al. | 382/118 |
| 2010/0172551 A1* | 7/2010 | Gilley et al. | 382/118 |
| 2010/0262367 A1* | 10/2010 | Riggins et al. | 701/209 |
| 2010/0266208 A1* | 10/2010 | Downing et al. | 382/195 |
| 2010/0311418 A1* | 12/2010 | Shi et al. | 455/432.1 |
| 2010/0329642 A1* | 12/2010 | Kam et al. | 386/280 |
| 2011/0206278 A1* | 8/2011 | Tysowski et al. | 382/166 |
| 2012/0120304 A1* | 5/2012 | Corcoran et al. | 348/349 |
| 2012/0129572 A1* | 5/2012 | Johnstone et al. | 455/552.1 |
| 2012/0216139 A1* | 8/2012 | Ording et al. | 715/773 |
| 2014/0045471 A1* | 2/2014 | Karnalkar et al. | 455/415 |

OTHER PUBLICATIONS

Luo, Jiebo; Subjected Content-Based Intelligent Cropping of Diggital Photos; © 2007; IEEE; 4 pages.*

"Sun Java System Portal Server 7.1 Update 1 Community Guide," Sun Microsystems, Santa Clara, 2007, pp. 1-94.

"TutCity.com Free tutorial resources—Change desktop themes," available as early as Oct. 27, 2009, retrieved at <<www.tutcity.com/tutorial/change-desktop-theme.21276.html>> on Dec. 2, 2009, 4 pgs.

PCT Search Report and Written Opinion mailed Aug. 2, 2011 for PCT Application No. PCT/US10/57502, 13 pages.

* cited by examiner

FIG. 1

LOOKUP TABLE 202

| User Interface Elements 112 | Parameters 110 |
|---|---|
| Header, ID: 12345 | Size: 400p x 80p |
| Icon | Size: 40p x 40p, Location: (20, 200) |
| Background | Brightness: 75%, Effect: Ripple |

IMAGE-DERIVED USER INTERFACE ENHANCEMENTS

BACKGROUND

Over the past thirty years, telephony has significantly evolved from the once-ubiquitous public switched telephone network service. Advances in technology have added an ever increasing array of features and capabilities to telecommunication devices, such as touch screens, user-friendly graphic user interfaces (GUIs), and image and video capturing components. Such touch screens and GUIs enable users to perform a wide variety of tasks, such as initiating or receiving phone calls, writing emails or text messages, browsing the Internet, and managing device settings such contact lists. The GUIs may also be specific to applications, such as applications developed by third party developers. Some GUIs allow for customization based on user selections of one or more settings such as a color setting, thus enabling a user to select a color to be associated with a GUI.

Video and image capturing components such as camera elements allow users to capture images or videos with their telecommunication devices. The images and videos are then stored on the telecommunication device and can be emailed or messaged to other devices. Some telecommunication devices allow users to select an image captured with the telecommunication device to be a background or screen saver image.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for enhancing elements of a graphic user interface (GUI) with portion(s) of an image. Such elements of a GUI may include headers, menu items, list items, contacts, icons, buttons, slide controls, form elements, or backgrounds. To enhance these elements of the GUI, the graphics and/or text associated with the elements of the GUI may be replaced or combined with portion(s) of an image. For example, a header, such as a bar or area at the top of the GUI, may be programmed to have the color blue and a time of day. To enhance the header, a portion of an image, such as a picture of a clock, may be selected and combined with the header. The enhanced header could, for instance, use the portion of the image in place of the area formerly colored blue and could overlay the time of day in front of the portion of the image.

The portion(s) of the image used to enhance the elements of the GUI may be selected based on parameters associated with the elements of the GUI. Parameters are criteria used for selecting portion(s) of the image. The parameters are associated with the elements of the GUI which the portion(s) are to enhance. For example, the header may be associated with a parameter that is set to the size of the GUI surface that the header occupies, such as 400 pixels by 80 pixels. Based on this parameter, a portion of the image can be selected and used to enhance the header. Other parameters, such as a coordinate pair referring to a location within the image, a brightness/darkness parameter, or a color variation parameter, may be utilized as well.

The images utilized for enhancing the elements of the GUI may be any sort of images, such as pictures or a video captured with a telecommunication device, images retrieved or received from a local or remote computing device, images retrieved or received from an application, or images created or modified by a user.

Figure 1:
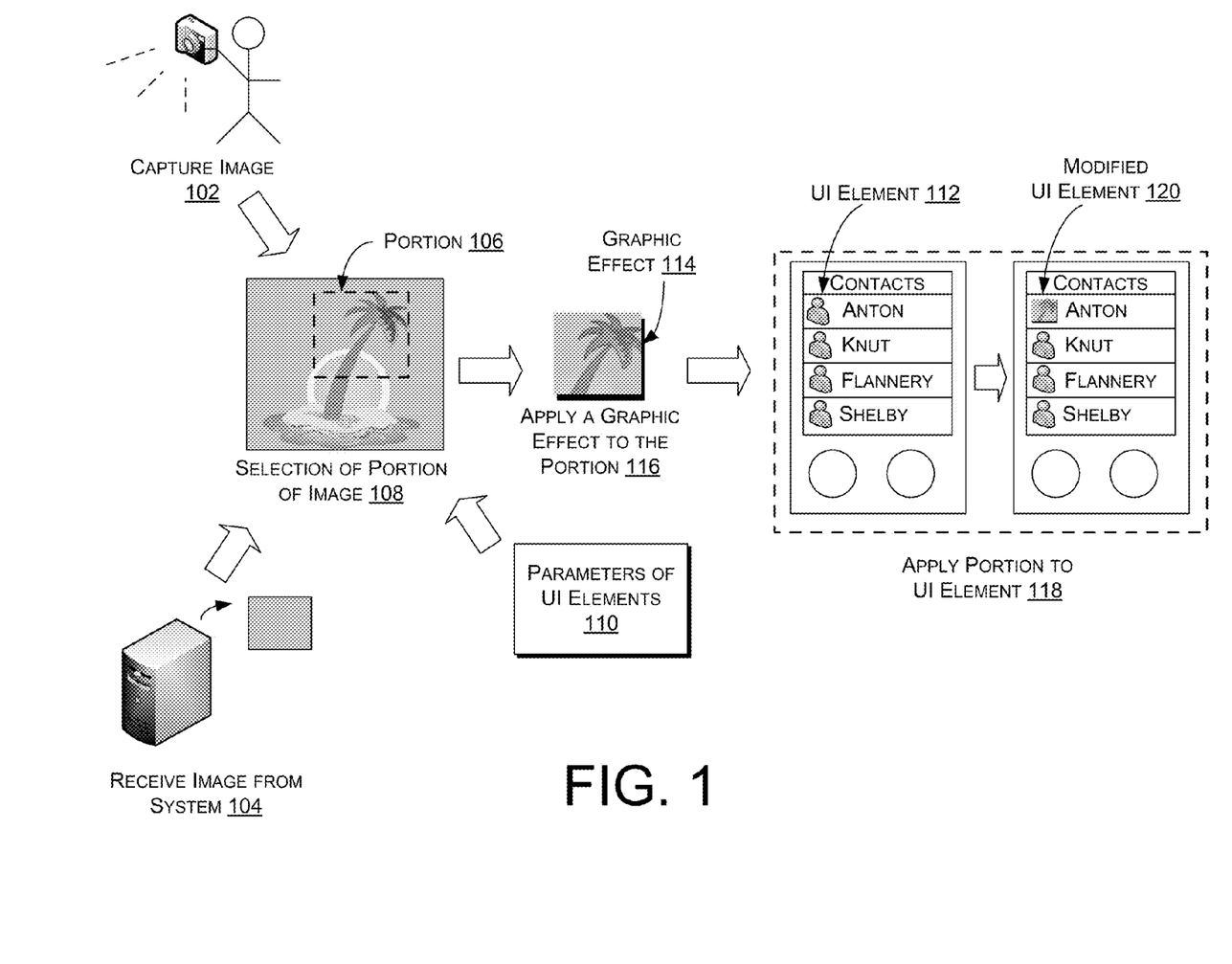
FIG. 1 illustrates an overview of a process for selecting a portion of an image based on parameters of a user interface element and for applying the selected portion to the user interface element, in accordance with various embodiments.
Figure 4:
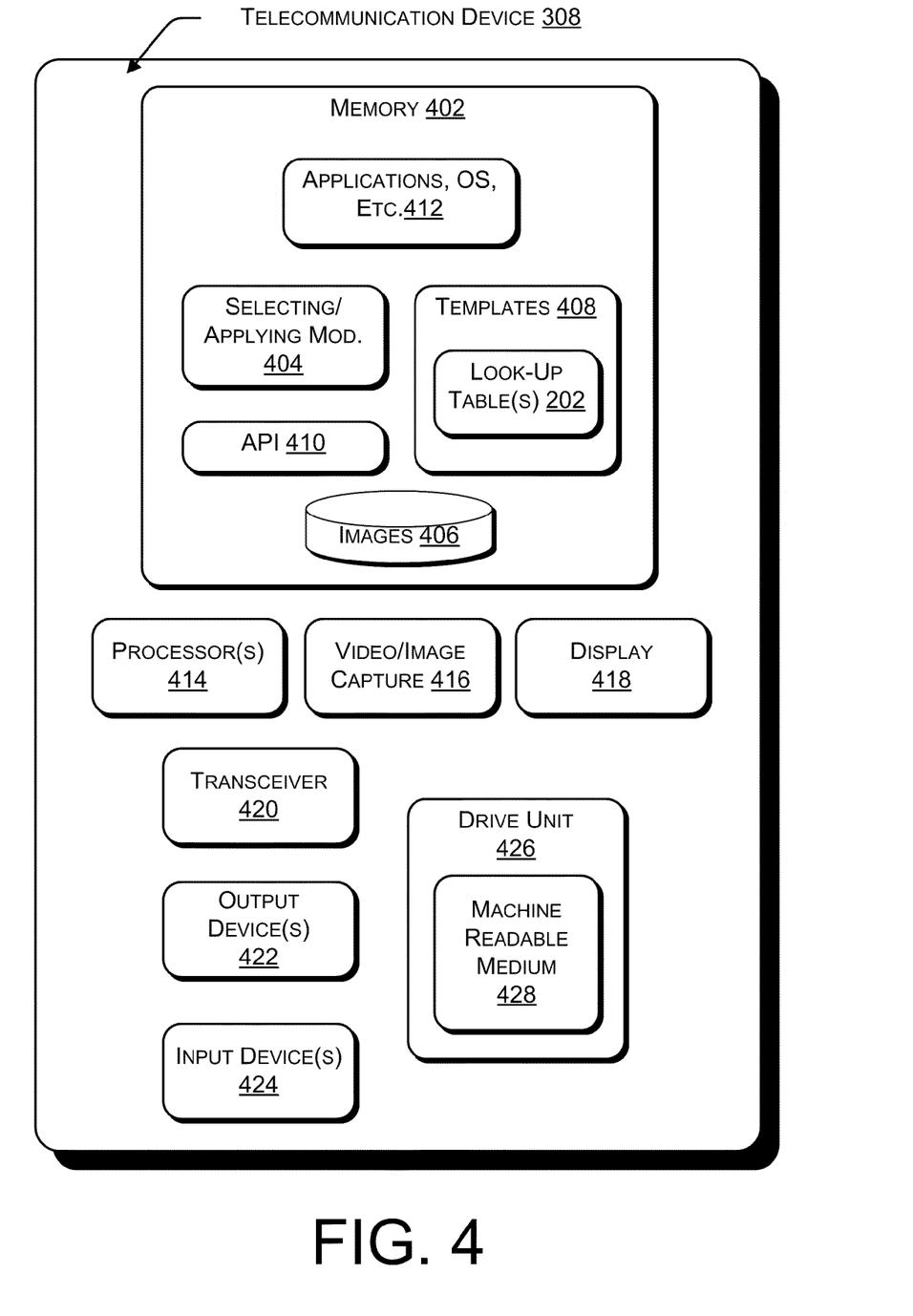
FIG. 4 illustrates a component level view of a telecommunication device, in accordance with various embodiments.
Figure 5:
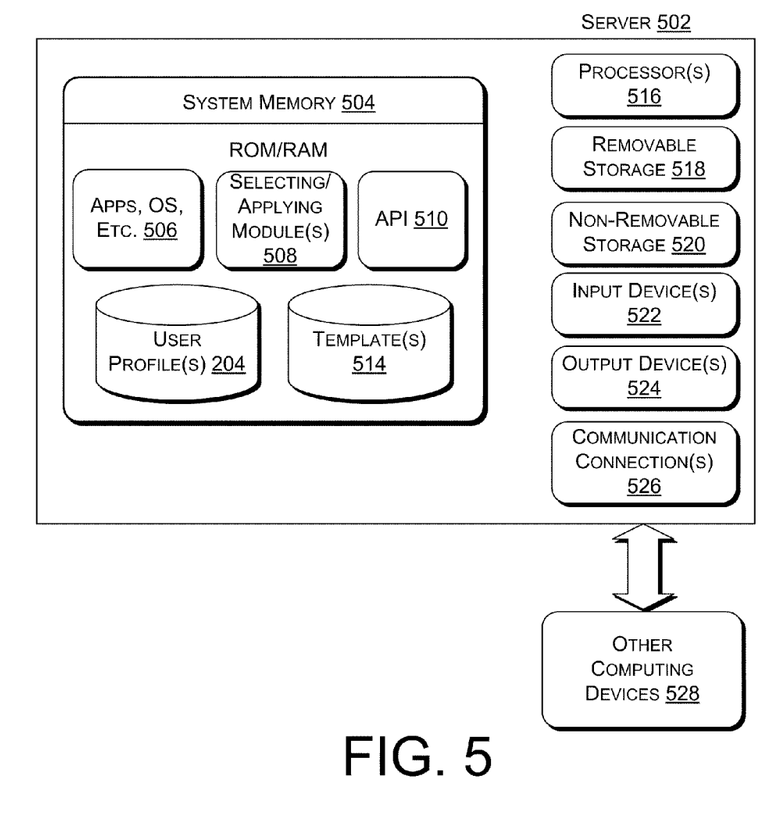
FIG. 5 illustrates a component level view of a server, in accordance with various embodiments.

FIG. 1 illustrates an overview of a process for selecting a portion of an image based on parameters of a user interface element and for applying the selected portion to the user interface element, in accordance with various embodiments. As shown, the image may be captured 102 by a video or image capture component of a telecommunication device or of a camera or camcorder. In other embodiments, the image is received or retrieved 104 from a local or remote system. In yet other embodiments (not shown), the image is received or retrieved from an application or is created or modified by a user. Once the image has been captured, received, or retrieved, a portion 106 of the image may be selected 108 based on parameters 110 associated with the user interface element 112. In some embodiments, a graphic effect 114 is then applied 116 to the selected portion 106 of the image. In various embodiments, the selected portion 106 is then applied 118 to the user interface element 112 by, for example, being displayed as a modified user interface element 120. The capturing 102, receiving/retrieving 104, selecting 108, applying 116, and applying 118 may each be performed by a single device, in subgroups by a plurality of devices, or separately by a plurality of devices. While the device or devices performing the capturing 102, receiving/retrieving 104, selecting 108, applying 116, and applying 118 are not shown in FIG. 1, each of these operations is performed by a device. The device or devices may be any sort of telecommunication devices or computing devices known in the art. Two such example devices are illustrated in FIGS. 4 and 5 and discussed in greater detail herein. For the purposes of discussing FIG. 1, this device or these devices will be referred as "the device."

As illustrated in FIG. 1, the device may utilize an image or video capturing component to capture 102 the image from which the portion 106 is selected. The image may be a still image, may be a frame of a video file recorded by the image or video capture component, or may be a loop of such a video file. The device may capture 102 the image at a pre-programmed time or in response to receiving input from a user. Also, in a number of embodiments, the image or video capturing and transferring is a continuous process—that is, images or video may be utilized in selecting 108, applying 116, and applying 118 in real time as they are captured.

In various embodiments, the device receives or retrieves 104 the image from a local or remote system. The local or remote system may be any sort of local or remote computing device and may be connected to the device via a network connection or local coupling. In one embodiment, the local or remote system is accessible via the Internet. Such a local or remote system may also, for example, store a plurality of images and may provide a graphic user interface (GUI) which enables a user to select from the plurality of images. In another embodiment, the local or remote computing device pushes the image to the device. For example, the image may be one of a plurality of images pre-loaded onto the device.

In some embodiments (not shown), the image is retrieved from an application. The application may be one that automatically provides images on a predetermined basis, such as daily. The application may also or instead act as an interface to a repository of images, enabling selection of one or more images of the repository. In other embodiments, the image is created by a user or modified by a user.

In some embodiments, the device captures 102, receives, or retrieves 104 multiple images, video frames, or video loops. Prior to performing the selecting 108, the device may automatically select one of the multiple images or may facilitate a user in selecting an image by, for example, displaying the multiple images in a GUI. If automatically selecting the image, the device may utilize any one or more of a number of techniques. The device may select the image randomly, based on user preferences, based on a time or location of image capture, based on traits intrinsic to each image (e.g., brightness, color variations, etc.), or based on any other technique known in the art. In embodiments in which the multiple images are multiple frames or loops of a video or multiple images of a sequence, the device selects each image, one after another.

In one embodiment, the preferences driving the automatic selection of the image may be provided via user input. For example, a device may pose a number of questions to a user which the user may answer with voice or text input. The answers are then utilized to determine a set of preferences.

In various embodiments, upon capturing 102, receiving or retrieving 104 an image, the device accesses the parameters 110. Each parameter 110 may be associated with one or more user interface elements 112 of a GUI and may specify a rule or criteria to be applied in selecting a portion 106 of the image. Such user interface elements 112 may include at least one of a header, a menu item, a list item, a contact, an icon, a button, a slide control, a form element, or a background, but may include any sort of user interface elements. For example, a user interface element 112 may be 50 pixels by 40 pixels in dimension. A parameter 110 associated with such a user interface element 112 may specify that the selected portion 106 to be applied to the user interface element 112 should also be 50 pixels by 40 pixels in dimension. Parameters 110 may also specify a pixel location within the image (e.g., an x,y coordinate pair) and an indication of where within the portion 106 that location is to belong (top left corner, center, etc.). Additionally, parameters 110 may include a brightness/darkness parameter, a color variation parameter, and/or any other sort of parameter known in the art.

Figure 2:
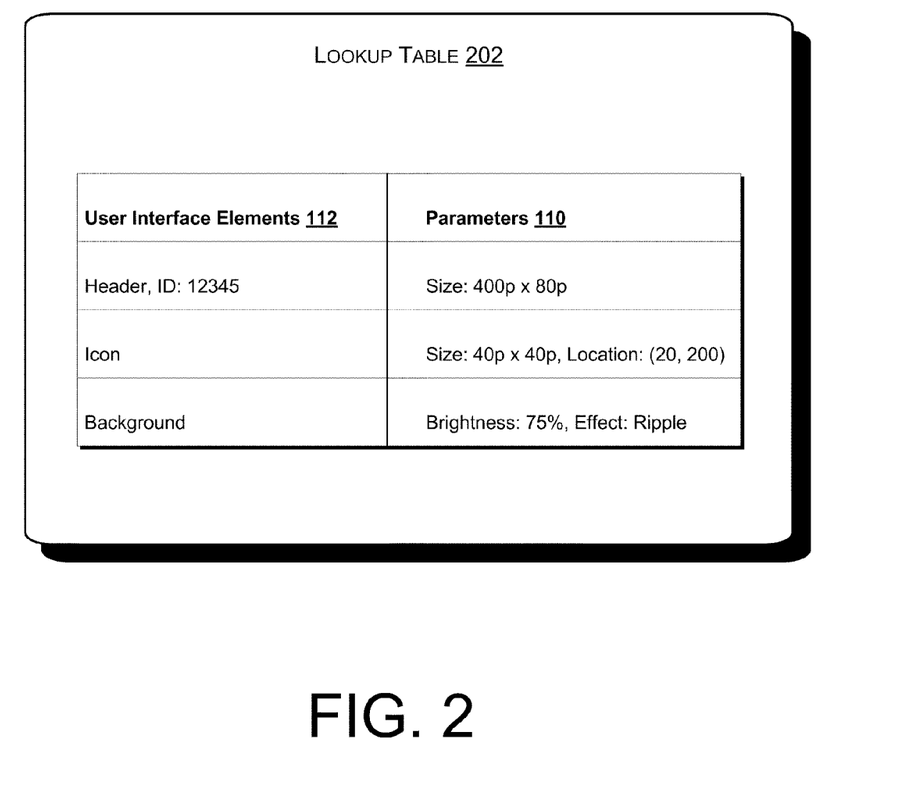
FIG. 2 illustrates a lookup table storing parameters associated with user interface elements, in accordance with various embodiments.

The parameters 110 may be specified in a lookup table, which may in turn be stored in a template. Such templates are described in greater detail herein. Also, lookup tables are illustrated in FIG. 2, which shows a lookup table 202. In one embodiment, a lookup table 202 is associated with a single telecommunication device or other computing device. In other embodiments, each application, operating system (OS), platform, etc. is associated with a lookup table 202. The contents of the lookup tables may include entry pairs, each pair including a user interface element 112 and a parameter 110. In other embodiments, rather than pairs, an entry for a user interface element 112 is associated with a plurality of entries for parameters 110, or visa versa. A lookup table 202 may specify only one user interface element 112 and one or more parameters 110 for that element 112, or may specify multiple user interface elements 112 and parameters 110. In some embodiments, each user interface element 112 within the lookup tables 202 is associated with an identifier. The device may then associate each identifier with a corresponding portion 106 when selecting 108 the portion 106.

In some embodiments, the device dynamically constructs the lookup tables 202 in response to receiving user interface element 112/parameter 110 pairs from a source, such as a third party application developer. To receive the parameters 110, the device may expose an application programming interface (API) that enables the source to programmatically provide parameters 110 for user interface elements 112, such as user interface elements 112 of a new application. The received user interface element 112/parameter 110 pairs may then be used to create a new lookup table 202 (such as a table for an application) or supplement an existing lookup table 202. The dynamic construction may occur on a periodic basis or may occur as the user interface element 112/parameter 110 pairs are received.

In some embodiments, lookup tables are associated with a theme. For example, several lookup tables associated with applications, the OS, and platform may be associated with a "bright" theme that includes parameters in each lookup table for selecting 108 bright portions 106 of the image. The theme may in turn be associated with a level of service, such as service provided by a telecommunication service provider, and different levels of service may "unlock" different themes and lookup tables.

In various embodiments, as further shown in FIG. 1, the device utilizes one or more rules to determine which portion 106 of the image to select. The rules may include rules specified by parameters 110 and/or rules utilizing the parameters 110. For example, a user interface element 112 may be associated with parameters 110 specifying a size and a location/coordinate within an image. Based on such parameters 110, the device may select 108 a portion 106 associated with the specified location and having the specified size.

In other embodiments, the parameters 110 only specify a size. In such embodiments, the device then utilizes one or more rules to select 108 a portion 106 having the specified size. For instance, the rules may be used to randomly select 108 a portion 106 from the image having a specified size. The device could use such rules, for example, to randomly or pseudo-randomly generate a location/coordinate which is then used along with the size to select 108 the portion 106. In another example, the rule may specify a brightness, color, or color variation parameter and may cause the device to select 108 a portion 106 which meets the brightness, color, or color variation parameter and which has a size meeting the size parameter 110.

In further embodiments, the parameters 110 specify a size and a trait, such as brightness, color, or color variation, which entails analysis of the image by the device. In such embodiments, the device analyzes the image based on the parameters 110 and selects 108 a portion 106 having the requisite size and color, color variation, or brightness.

In some embodiments, once the portion or portions 106 have been selected 108 based on the parameters 110, the device associates each portion 106 with an identifier of a user interface element 112 for which the portion 106 was selected. As mentioned above, the identifiers may be stored in the lookup tables 202, in conjunction with the parameters 110.

In various embodiments (not shown), in addition to or instead of performing the selecting 108, the device selects a color of the image to be applied to the user interface of the device. The device may select the color based on an analysis of the colors found in the image and may utilize, for example, a histogram. The application of the color to the user interface is described in detail further herein.

As is further illustrated in FIG. 1, once the portion 106 has been selected 108, the device may apply 116 one or more graphic effects 114 to the selected portion 106. In other embodiments, the applying 116 is optional. In yet other embodiments, no graphic effects 114 are associated with the user interface element 112 corresponding to the portion 106.

Graphic effects 114 may include effects which are already applied to the user interface element 112. For example, if the user interface includes a list of contacts and the currently selected contact has a highlight effect applied to it (e.g., is shown as darker or lighter than other contacts), that has highlight effect may be applied to the portion 106 if the portion 106 corresponds to the user interface element 112 for the currently selected contact. In some embodiments, the graphic effects 114 include at least one of shading, brightening, dimpling, rippling, a button effect, a blurring, a color inversion effect, or a black and white effect.

In various embodiments, the graphic effects 114 are specified in the lookup table having the parameters 110 for their associated user interface elements. Again, FIG. 2 shows such a lookup table 202. In other embodiments, the graphic effects 114 are specified in a separate table, template or file and are indexed by the above-mentioned identifiers for the user interface elements 112. The device may access the graphic effects 114 and apply them to the portion 106, creating a modified portion 106 of the image. In FIG. 1, the graphic effect 114 is a shadow effect and is applied to the portion 106 to generate a version of the portion 106 having a shadow.

As shown in FIG. 1, once the graphic effects 114 are applied 116 to the portion 106, the device applies 118 the portion 106 to the user interface element 112. The applying 116 may comprise the device generating a modified user interface element 120 based on the user interface element 112 and the portion 106 (and on graphic effects 114, if there are any). To generate the modified user interface element 120, the device may apply any sort of text or data associated with the user interface element 112 to the portion 106. For example, if the user interface element 112 represents a contact on a contact list, the element 112 may include a textual representation of a contact name (e.g., "Anton") or data, such as a picture of the contact. To preserve the text/data which enables identification of the user interface element 112 as a contact, the device may apply this text/data to portion 106 by, for example, superimposing the text/data on top of the portion 106. In another example, the user interface element 112 may be an icon association with the contact instead of the entire representation of the contact. In such an example, device may simply replace a default icon with the portion 106. Such a modified user interface element 120 would actually be a replacement of the original user interface element 112 with the portion 106.

Once the device has generated the modified user interface element 120, the modified user interface element 120 may be displayed as part of the overall user interface.

While FIG. 1 only illustrates one portion 106 being selected 108 and applied 118, multiple portions 106 may be simultaneously selected 108 and applied 118 to, for example, create an overall themed appearance to the user interface of the device.

As previously mentioned, the device may select a color of the image to be applied to the user interface of the device in addition to or instead of performing the selecting 108. In such embodiments, rather than applying 116 the portion 106 to the user interface element 112, the device applies the color to the user interface element 112 to create a modified user interface element 120 having the selected color. In one embodiment, the device may apply the color in the same manner that it applies 116 the portion 106.

As mentioned above, the device may perform the selecting 108 and applying 118 repeatedly or continuously until an indication is received. Thus, for example, the device may perform the selecting 108 and applying 118 in real time based off of frames of a video as that video is captured. In such embodiments, the indication terminating the selecting 108 and applying 118 can be a termination of the video feed or a selection of a button or control configured to indicate a user desire for a specific portion 106 or set of portions 106 for the modified user interface element(s) 120. Such a button or control may be a physical key or GUI key, or any other sort of control known in the art.

Figure 3:
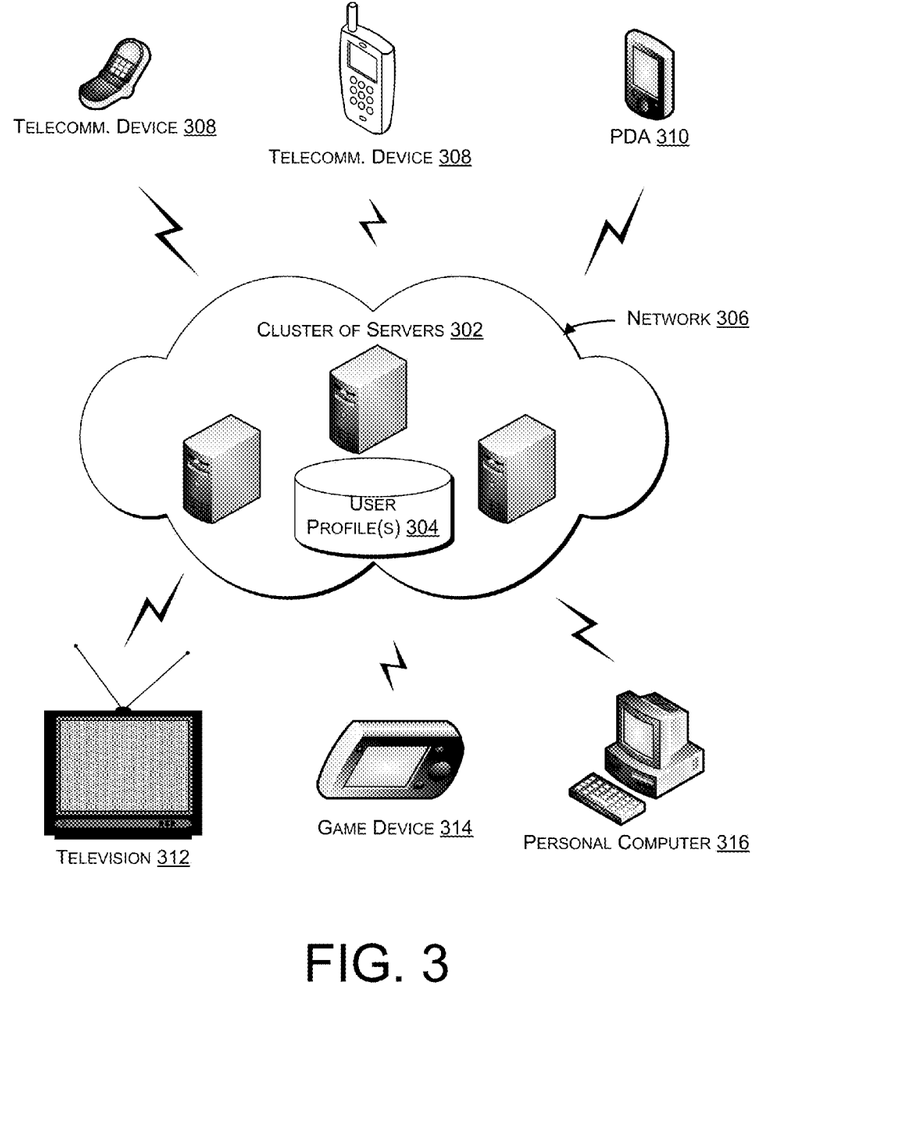
FIG. 3 illustrates a network view showing a cluster of servers in communication with a plurality of devices which are associated with a user profile, in accordance with various embodiments.

FIG. 3 illustrates a network view showing a cluster of servers in communication with a plurality of devices that are associated with a user profile, in accordance with various embodiments. As illustrated, a cluster of servers 302, at least one of which stores a plurality of user profiles 304, may be connectable via a network 306 to a plurality of devices 308-316. The devices 308-316 include telecommunication devices 308, personal digital assistants (PDAs) 310, televisions 312, game devices 314, and personal computers (PCs) 316. One, all, or a subset of these devices 308-316 may be associated with one of the user profiles 304, the one of the user profiles 304 in turn being associated with a telecommunication service account.

In various embodiments, the cluster of servers 302 includes one or more server computing devices, such as application servers, web servers, and/or data storage servers. Such server computing devices may be any sort of computing devices known in the art. For example, one of the server computing devices may be a personal computer (PC), a laptop computer, a workstation, a server system, a mainframe, a telecommunications device, a personal digital assistant (PDA), or a set-top box. In some embodiments, one of the server computing devices is a virtual machine implemented on one or more computing devices. Additional hardware and software components of the an example server of the cluster of servers 302 are illustrated in FIG. 5 and described in greater detail below with reference to that figure.

In some embodiments, one or more servers of the cluster of servers 302 are configured with modules of executable instructions to perform the selecting 108, the applying 116, and/or the applying 118, as described above. The one or more servers may receive images, such as pictures taken with a telecommunication device, and may select 108 portions 106 of the images based on parameters 110 associated with user interface elements 112. In various embodiments, the parameters 110 to be used in the selecting 108 are stored in a user profile 304 that is associated with the device or user from which the image was received.

Each such user profile 304 may be associated with a single telecommunication service account, which may in turn be associated with one or more telecommunication devices or other devices, such as any or all of devices 308-316. Further, each user profile 304 may include a list of the associated telecommunication or other devices, templates for each device or a template for all of the devices. Within the template or templates may be a lookup table for each device or for each application, OS, platform, etc. on each device. In one embodiment, these templates and lookup tables are gathered from the various devices associated with the service account and are then stored in the associated user profile 304.

In performing the selecting 108, all or a subset of the parameters 110 stored in the user profile 304 may be used to select 108 portions 106 of the images. After optionally performing the applying 116 of the graphic effects 114, the one or more servers may provide the selected portions 106 to the devices associated with the user profile 304 and/or may apply 118 the selected portions 106 to user interface elements of a web page to be provided to a device associated with the user profile 304. In some embodiments, rather than providing all of the portions to each of the devices, the parameters 110 and user profile 304 are used to determine which user interface element 112 of which device the portion 106 was selected 108 for. The one or more servers may then provide that portion 106 to that device.

In other embodiments, rather than performing the selecting 108, the one or more servers of the cluster of servers 302 receive portions 106 of an image selected for one or more user interface elements 112 and may provide those portions 106 to devices specified in a user profile 304 that is associated with the device providing the portions 106 and/or may apply 118 the portions 106 to user interface elements of a web page to be provided to a device associated with the user profile 304. For example, a telecommunication device may provide the one or more servers with a portion 106 of an image and an identifier of a user interface element 112 to which the portion 106 is to be applied. The portion 106 and identifier may then be sent to all devices specified in the user profile 304 or only to devices listing the identified user interface element 112 in their associated templates or lookup tables.

In various embodiments, the network 306 connecting the cluster of servers 302 and the devices 308-316 represents any one or more networks known in the art, such as cellular networks and/or data networks, including wide area networks (WANs), local area networks (LANs), personal area networks (PANs), and/or the Internet. For example, a telecommunication device 308 could be connected to both cellular and data networks and the cluster of servers 302 and other devices 310-316 could be connected exclusively to data networks. A connection between one of the telecommunication devices 308 and the cluster of servers 302 may be through a number of routers, base stations, and/or devices acting as bridges between cellular and data networks. Communications between the cluster of servers 302 and other devices 308-316 may utilize any sort of communication protocol known in the art for sending and receiving messages, such as the Transmission Control Protocol/Internet Protocol (TCP/IP) and/or the Hypertext Transfer Protocol (HTTP).

In various embodiments, the telecommunication devices 308, PDA 310, television 312, game device 314, and PC 316 are any such telecommunication and computing devices as are known in the art. Devices 308-316 may also be representative of other devices not shown in FIG. 3, such as a landline phone, an Internet phone, a media player, a personal a laptop, a netbook, or a reading device. Any of the devices 308-316 may perform the capture 102, retrieval/receiving 104, selecting 108, and/or applying 116/118, as described above in greater detail. An example telecommunication device, which may implement any of devices 308-316, is further illustrated in FIG. 4 and described further herein with reference to that figure.

FIG. 4 illustrates a component level view of a telecommunication device, in accordance with various embodiments. As shown, the telecommunication device 308 may include a memory 402, the memory storing a selecting/applying module 404, a plurality of images 406, template(s) 408 having lookup tables 202, an API 410, and applications, OS, etc. 412. The telecommunication device 308 may further include processor(s) 414, a video/image capture component 416, a display 418, a transceiver 420, output device(s) 422, input device (s) 424, and drive unit 426 including a machine readable medium 428.

In various embodiments, memory 402 generally includes both volatile memory and non-volatile memory (e.g., RAM, ROM, Flash Memory, miniature hard drive, memory card, or the like). Additionally, in some embodiments, memory 402 includes a SIM (subscriber identity module) card, which is a removable memory card used to identify a user of the telecommunication device 308 to a telecommunication service provider.

In some embodiments, the selecting/applying module 404 performs any or all of the selecting 108, applying 116, and/or applying 118, which are described above in detail with regard to FIG. 1. The selecting/applying module 404 may comprise a plurality of executable instructions which may comprise a single module of instructions or which may be divided into any number of modules of instructions.

In various embodiments, the images 406 are stored in a database, a file, or any other sort of storage format. The images 406 may comprise the images captured 102, retrieved/received 104, and/or created/modified, as well as images preloaded onto the telecommunication device 308. The images 406 may include both still images and videos, and may further be of any sort of format known in the art, such JPEG, bitmap, TIFF, MPEG, etc. In some embodiments, the images 406 are stored in association with metadata describing the images, such as metadata describing a time or location of image capture, retrieval, reception, creation, or modification.

In some embodiments, the templates 408 are each comprised of one or more lookup tables 202, the lookup tables 202 having been described above in detail. The templates 408 may be databases, files, or any other sort of structures known in the art. For example, templates 408 may each comprise an XML document. Also, the templates 408 may be specific to the telecommunication device 308, to an application, OS, or platform of the telecommunication device 308, or to a group of applications.

In various embodiments, the API 410 provides a set of interfaces allowing application providers to create lookup tables for their applications or to build upon existing lookup tables, such as a lookup table for an entire telecommunication device 308. The interfaces of the API 410 may in turn correspond to a set of functions, such as a function for creating a lookup table or a function for extending/building upon a lookup table. Such functions may take as parameters a set of parameters and user interface element pairs, as well as an identifier of the application, OS, platform, or device to which the user interface elements 112 belong.

In various embodiments, the applications, OS, etc. 412 comprise any executing instructions on the telecommunication device 308. Such instructions include, for example, an OS of the telecommunication device 308, drivers for hardware components of the telecommunication device 308, applications providing interfaces to settings or personalizations of the telecommunication device 308, applications made specifically for the telecommunication device 308, and third party applications of application providers. Collectively these applications/processes are hereinafter referred to as applications, OS, etc. 412. Such applications, OS, etc. 412 may be entirely or partially implemented on the telecommunication device 412. In some embodiments, the applications, OS, etc. 412 are implemented partially on another device or server.

The applications, OS, etc. 412 may also each be configured to receive portions 106 and identifiers of user interface elements 112 and to perform the applying 118 of the portions 106 to the user interface elements 112. In other embodiments, rather than performing the applying 118 themselves, the applications, OS, etc. 412 receive modified user interface elements 120 and may display those modified user interface elements 120.

In some embodiments, the processor(s) 414 is a central processing unit (CPU), a graphics processing unit (GPU), or both CPU and GPU, or other processing unit or component known in the art.

In various embodiments, the video/image capture component 416 is any sort of camera or camcorder known in the art capable of capturing images or videos. Such a video/image capture component 416 may be, for example, integrated into an opposite surface of the telecommunication device 308 from the display 418. In other embodiments, the video/image capture component 416 is integrated into any surface of the telecommunication device 308.

In various embodiments, the display 418 is a liquid crystal display or any other type of display commonly used in telecommunication devices. For example, display 418 may be a touch-sensitive touch screen, and can then also act as an input device or keypad, such as for providing a soft-key keyboard, navigation buttons, or the like.

In some embodiments, the transceiver(s) 420 includes any sort of transceivers known in the art. For example, transceiver(s) 420 may include a radio transceiver and interface that performs the function of transmitting and receiving radio frequency communications via an antenna. The radio interface facilitates wireless connectivity between the telecommunication device 308 and various cell towers, base stations and/or access points.

Transceiver(s) 420 may also include a near field interface that performs a function of transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunication device 308.

Also, transceiver(s) 420 may include a wireless LAN interface that performs the function of transmitting and receiving wireless communications using, for example, the IEEE 802.11, 802.16 and/or 802.20 standards. For example, the telecommunication device 308 can use a Wi-Fi interface to communicate directly with a nearby wireless access point such as for accessing the Internet directly without having to perform the access through the telecommunication service provider's network.

In some embodiments, the output device(s) 422 include any sort of output devices known in the art, such as a display (already described as display 418), speakers, or vibrating mechanism, or tactile feedback mechanisms. Output device(s) 422 may also include ports for one or more peripheral devices, such as headphones, peripheral speakers, or a peripheral display.

In various embodiments, input device(s) 424 include any sort of input devices known in the art. For example, input device(s) 424 may include a microphone, a keyboard/keypad, or a touch-sensitive display (such as the touch-sensitive touch screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 428 stores one or more sets of instructions (e.g., software) embodying any one or more of the methodologies or functions described herein. The instructions may also reside, completely or at least partially, within the memory 402 and within the processor 414 during execution thereof by the telecommunication device 308. The memory 402 and the processor 414 also may constitute machine readable media 428.

FIG. 5 illustrates a component level view of a server 502, such as a server of the cluster of servers 302, in accordance with various embodiments. As illustrated, server 502 may comprise a system memory 504 storing application, OS, etc. 506, selecting/applying module(s) 508, API 510, user profile(s) 304, and templates 514. Also, server 502 may include processor(s) 516, a removable storage 518 and non-removable storage 520, input device(s) 522, output device(s) 524 and communication connections 526 for communicating with other computing devices 528.

In various embodiments, system memory 504 is volatile (such as RAM), non-volatile (such as ROM, flash memory, etc.) or some combination of the two. The applications, OS, etc. of the server 502 may be similar to the applications, OS, etc. 412 of the telecommunication device 406, the selection/applying module 508 may be similar to the selecting/applying module 404, the API 510 may be similar to the API 410, and the templates 514 may be similar to the templates 408. Accordingly, the descriptions of the selecting/applying module 404, of the templates 408, of the API 410, and of the applications, OS, etc. 412 apply to the application, OS, etc. 506, selecting/applying module(s) 508, API 510, and templates 514. As mentioned above, however, templates 514 may differ from templates 408 in that templates 514 may each be associated with a user profile 304. The user profile(s) 304 are described above in greater detail above with respect to FIG. 3.

In some embodiments, the processor(s) 516 is a central processing unit (CPU), a graphics processing unit (GPU), or both CPU and GPU, or other processing unit or component known in the art.

Server 502 may also include additional data storage devices (removable and/or non-removable) such as, for example, magnetic disks, optical disks, or tape. Such additional storage is illustrated in FIG. 5 by removable storage 518 and non-removable storage 520. Computer storage media may include volatile and nonvolatile, removable and non-removable media implemented in any method or technology for storage of information, such as computer readable instructions, data structures, program modules, or other data. System memory 504, removable storage 518 and non-removable storage 520 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server 502. Any such computer-readable storage media may be part of server 502.

In various embodiment, any or all of system memory 504, removable storage 518, and non-removable storage 520, store programming instructions which, when executed, implement some or all of the above-described operations of the servers of the cluster of servers 302.

Server 502 may also have input device(s) 522 such as a keyboard, a mouse, a touch-sensitive display, voice input device, etc. Output device(s) 524 such as a display, speakers, a printer, etc. may also be included. These devices are well known in the art and need not be discussed at length here.

Server 502 may also contain communication connections 526 that allow the device to communicate with other computing devices 528, such as other servers of a cluster of servers 302 or other devices such as devices 308-316.

Figure 6:
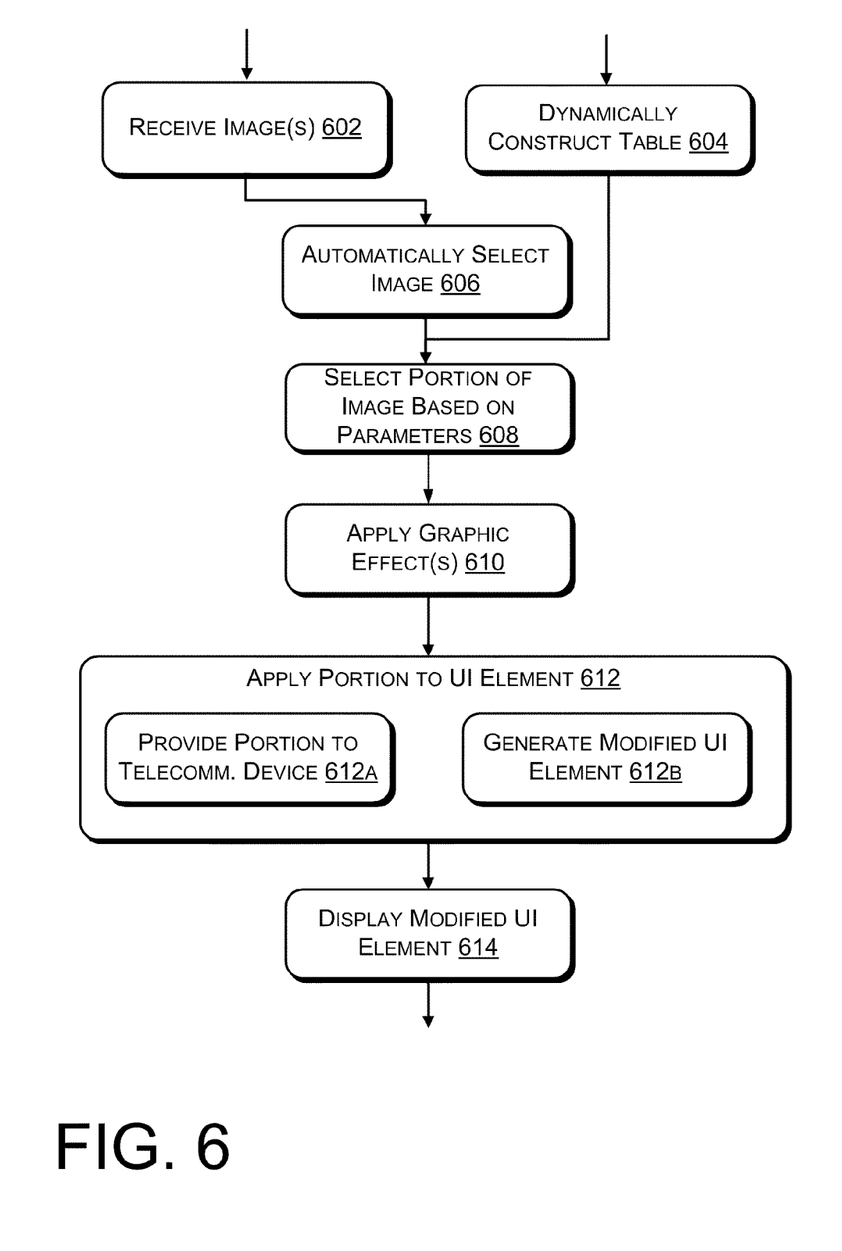
FIG. 6 illustrates a flowchart showing a method of selecting and applying a portion of an image, in accordance with various embodiments.

FIG. 6 is flowchart showing a method of selecting and applying a portion of an image, in accordance with various embodiments. As shown, a telecommunication device may first receive an image, block 602. In some embodiments, the receiving 602 comprises capturing the image via a video or image capture component of the telecommunication device, receiving the image from a remote or local device, receiving the image from an application, or enabling a user to create or modify the image.

Independently of the receiving 602, the telecommunication device may dynamically construct a lookup table at block 604 for use in selecting a portion of the image. The constructing 604 may be based on parameters received from application providers, and the application providers may provide the parameters via an application programming interface. In some embodiments, the lookup table has entries for user interface elements and corresponding entries for parameters that are parameter to be applied in selecting portions of the image for the user interface elements. Also, the lookup table may be one of a plurality of lookup tables of a template. Such lookup tables may include tables for at least one of a telecommunication device, a platform, an operating system or an application. Further, a subset of the plurality of lookup tables may be associated with a theme and the theme may be associated with a level of service.

In various embodiments, after receiving 602 the image, the telecommunication device automatically selects an image from a plurality of images at block 606.

After selecting 606 the image, the telecommunication device may select a portion of the image at block 608 based at least on parameters associated with a user interface element of the telecommunication device, such as the parameters specified in the lookup table. In some embodiments, the parameters include at least one of a portion size, an image location, a coordinate pair, a brightness/darkness parameter, or a color variation parameter. Also, the user interface element may be one of a header, a menu item, a list item, a contact, an icon, a button, a slide control, a form element, or a background.

In various embodiments, the telecommunication device then applies one or more graphic effects associated with the user interface element to the selected portion of the image at block 610. Such graphic effects may include at least one of shading, brightening, dimpling, rippling, a button effect, a blurring, a color inversion effect, or a black and white effect.

Next, the telecommunication device may apply the selected portion of the image to the user interface element at block 612. In some embodiments, the applying includes providing the selected portion of the image and an indication of its corresponding user interface element to a telecommunication device at block 612A. In further embodiments, the applying comprises generating a modified user interface element based on the selected portion of the image at block 612B.

In some embodiments, the telecommunication device then displays the modified user interface element in place of the user interface element at block 614.

Figure 7:
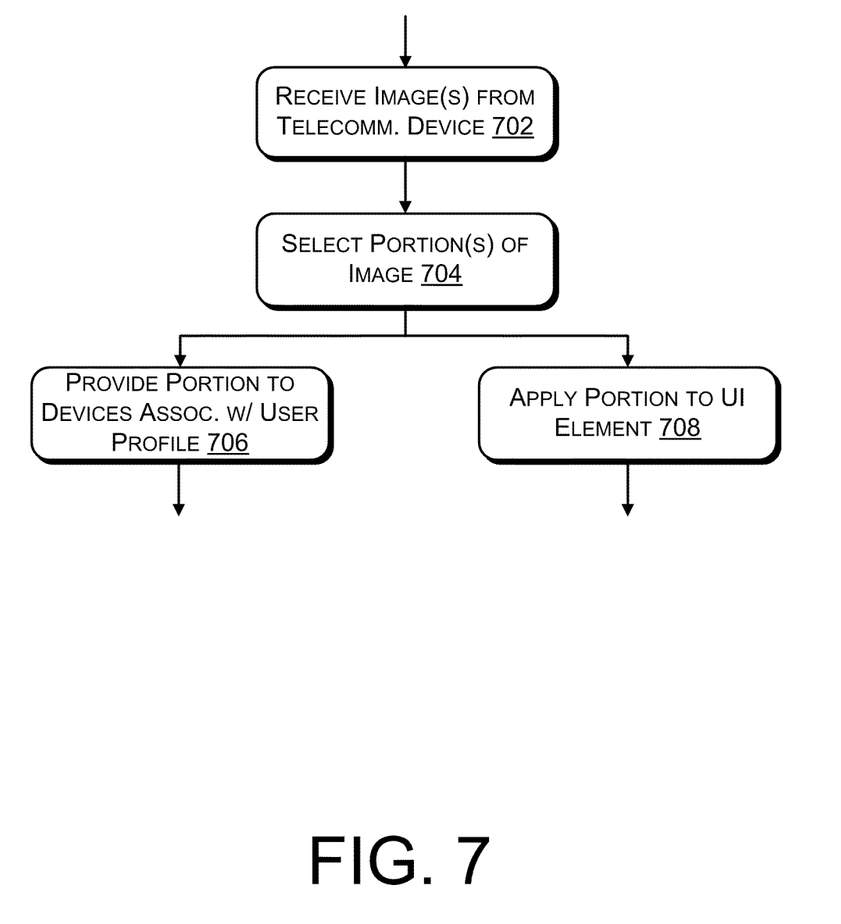
FIG. 7 illustrates a flowchart showing a method of selecting a portion of an image and providing the portion to device(s) associated with a user profile, in accordance with various embodiments.

FIG. 7 is a flowchart showing a method of selecting a portion of an image, in accordance with various embodiments. As shown, one or more computing devices, such as a server, web server, and/or data storage cluster, may first receive an image associated with a user profile at block 702. In some embodiments, the user profile is associated with a telecommunication device service account. Upon receiving the image, the one or more computing devices may then select one or more portions of the image for one or more user interface elements of one or more computing and/or telecommunication devices that are associated with the user profile at block 704. The computing and/or telecommunication devices may include at least one of the one or more computing devices performing the selecting, a cellular phone, a personal digital assistant, a television, a personal computer, or a game device. The one or more computing devices may then provide the selected portions of the image to the computing and/or telecommunication devices at block 706 or apply one of the selected portions of the image to one of the user interface elements at block 708.

Figure 8:
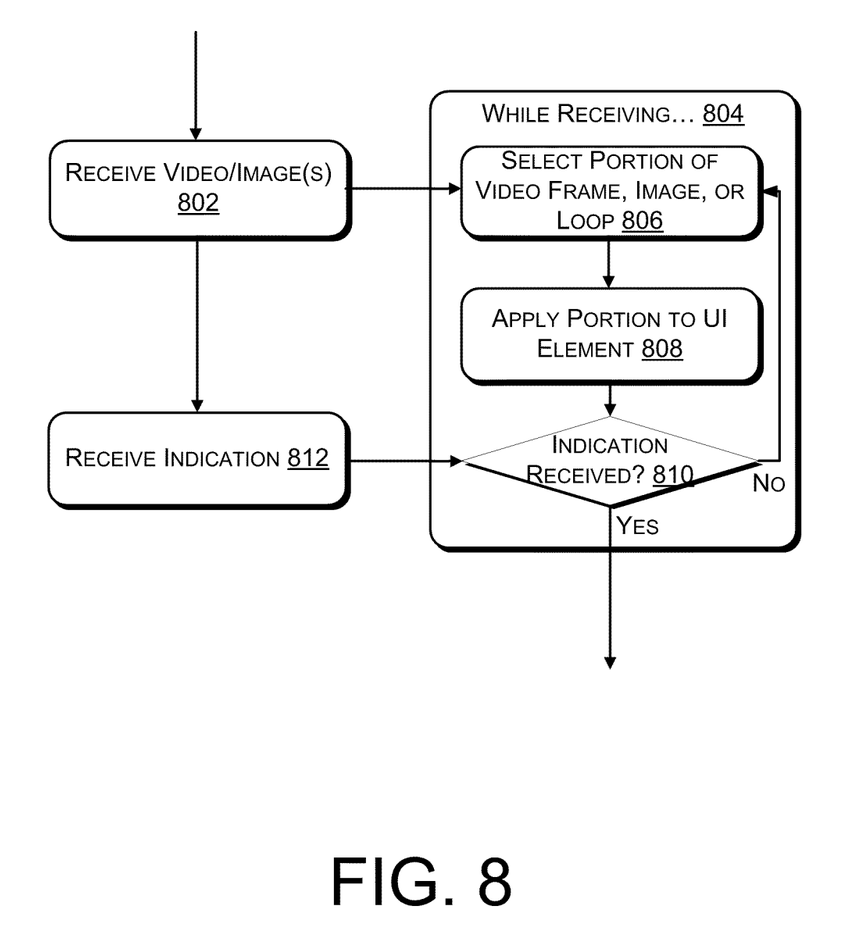
FIG. 8 illustrates a flowchart showing a method of repeatedly performing selecting and applying a portion of an image until an indication is received, in accordance with various embodiments.

FIG. 8 is a flowchart showing a method of repeatedly performing selecting and applying a portion of an image until an indication is received, in accordance with various embodiments. As shown, a telecommunication device may receive a video or sequence of images from a video and/or image capture component of the telecommunication device at block 802. While receiving the video or sequence of images, the telecommunication device may perform a number of operations at block 804. First, the telecommunication device may select a portion of a video frame of the video, an image of the sequence of images, or a multi-frame loop of the video at block 806. The selecting 806 may be based at least on parameters associated with the user interface element. Next, the telecommunication device may apply the selected portion of the image, frame, or loop to a user interface element of the telecommunication device at block 808. The telecommunication device may then determine if an indication has been received at block 810, and may repeat the selecting 706 and applying 808 until an indication is received. In various embodiments, the telecommunication device then receives the indication at block 812. In some embodiments, the indication is input received from a telecommunication device user indicating a portion of a video frame of the video, an image of the sequence of images, or a multi-frame loop of the video which the user wishes to select for the user interface element.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method implemented in a telecommunication device, the method comprising:
   automatically selecting a portion of an image, the automatic selecting being based on parameters associated with a user interface element of the telecommunication device, the parameters determining which portion of the image is automatically selected;

applying the selected portion of the image to the user interface element; and specifying the parameters in a lookup table having entries for the user interface elements and corresponding entries for parameters, the lookup table is one of a plurality of lookup tables, wherein a subset of the plurality of lookup tables are associated with a theme, the theme being associated with a level of service provided by a service provider.

2. The method of claim 1, further comprising receiving the image, the receiving including capturing the image via a video or image capture component of the telecommunication device, receiving the image from a remote or local device, receiving the image from an application, or enabling a user to create or modify the image.

3. The method of claim 1, further comprising automatically selecting the image from a plurality of images of the telecommunication device.

4. The method of claim 1, wherein the lookup table is one of a plurality of lookup tables of a template, wherein the plurality of lookup tables include tables for at least one of a telecommunication device, a platform, an operating system or an application.

5. The method of claim 1, further comprising dynamically constructing the lookup table based on parameters received from application providers, the application providers providing the parameters via an application programming interface.

6. The method of claim 1, wherein the parameters include at least one of a portion size, an image location, a coordinate pair, a brightness/darkness parameter, or a color variation parameter.

7. The method of claim 1, wherein the user interface element is one of a header, a menu item, a list item, a contact, an icon, a button, a slide control, a form element, or a background.

8. The method of claim 1, further comprising applying one or more graphic effects associated with the user interface element to the selected portion of the image.

9. The method of claim 8, wherein the graphic effects include at least one of shading, brightening, dimpling, rippling, a button effect, a blurring, a color inversion effect, or a black and white effect.

10. The method of claim 1, wherein the applying further comprises providing the selected portion of the image and an indication of its corresponding user interface element to a telecommunication device.

11. The method of claim 1, wherein the applying further comprises generating a modified user interface element based on the selected portion of the image.

12. The method of claim 11, further comprising displaying the modified user interface element in place of the user interface element.

13. The method of claim 1, wherein the service provider comprises a telecommunication service provider.

14. The method of claim 13, wherein different levels of service make the parameters associated with different subsets of the plurality of lookup tables available for the automatically selecting the portion of the image.

15. A method implemented in one or more computing devices, the method comprising:

receiving an image associated with a user profile;

automatically selecting one or more portions of the image for one or more user interface elements of one or more computing and/or telecommunication devices that are associated with the user profile, the automatic selecting being based on parameters respectively associated with the one or more user interface elements, the parameters determining which portion or portions of the image are automatically selected;

one or both of:

providing the selected portions of the image to the computing and/or telecommunication devices, and/or applying one of the selected portions of the image to one of the user interface elements; and specifying the parameters in a lookup table having entries for the user interface elements and corresponding entries for parameters, the lookup table is one of a plurality of lookup tables, associating a theme with a subset of the plurality of lookup tables, the themes being associated with a level of service provided by a service provider.

16. The method of claim 15, wherein the one or more computing devices comprise a server, a web server, and/or data storage cluster.

17. The method of claim 15, wherein the user profile is associated with a telecommunication device service account.

18. The method of claim 15, wherein the computing and/or telecommunication devices include at least one of the one or more computing devices performing the selecting, a cellular phone, a personal digital assistant, a television, a personal computer, or a game device.

19. A telecommunication device comprising:

a processor;

a video and/or image capture component coupled to the processor; and one or more modules of executable instructions configured to be executed by the processor and to perform operations including:

receiving a video or sequence of images from the video and/or image capture component;

while receiving the video or sequence of images, automatically selecting a portion of a video frame of the video, an image of the sequence of images or a multi-frame loop of the video, the automatic selecting being based on parameters associated with a user interface element of the telecommunication device, the parameters determining which portion of the video frame, image, or multi-frame loop is automatically selected, applying the selected portion of the frame, image, or loop to the user interface element, repeatedly performing the selecting and applying until an indication is received, specifying the parameters in one of a plurality of lookup tables having entries for the user interface elements and corresponding entries for parameters, and associating a theme with a subset of the plurality of lookup tables, the themes being associated with a level of service provided by a telecommunication service provider.

20. The telecommunication device of claim 19, wherein the indication is input received from a telecommunication device user indicating a portion of a video frame of the video, an image of the sequence of images, or a multi-frame loop of the video which the user wishes to select for the user interface element.

* * * * *